United States Patent [19]

Kestermeier

[11] 4,085,827

[45] Apr. 25, 1978

[54] DISC BRAKE WEAR INDICATOR

[75] Inventor: William J. Kestermeier, South Bend, Ind.

[73] Assignee: The Bendix Corporation, South Bend, Ind.

[21] Appl. No.: 734,907

[22] Filed: Oct. 22, 1976

[51] Int. Cl.² .............................................. F16D 66/02
[52] U.S. Cl. ................................................... 188/1 A
[58] Field of Search .................... 188/1 A; 116/114 Q

[56] References Cited

U.S. PATENT DOCUMENTS

| 3,141,524 | 7/1964 | Mishler | 116/114 Q X |
| 3,716,113 | 2/1973 | Kobayashi et al. | 188/1 A |
| 3,958,666 | 5/1976 | Hooten et al. | 188/1 A |

FOREIGN PATENT DOCUMENTS

| 2,224,330 | 10/1974 | France | 188/1 A |
| 1,928,722 | 12/1970 | Germany | 188/1 A |
| 2,502,726 | 7/1975 | Germany | 188/1 A |
| 19,048 | 8/1969 | Japan | 188/1 A |
| 1,407,411 | 9/1975 | United Kingdom | 188/1 A |

*Primary Examiner*—George E. A. Halvosa
*Attorney, Agent, or Firm*—Paul David Schoenle; Ken C. Decker

[57] ABSTRACT

A brake wear indicator is connected to a backing plate and extends around the periphery thereof to engage a disc, when a friction element is worn to a predetermined dimension. The brake wear indicator comprises a generally U-shaped spring clip that terminates in a pair of prongs that cooperate with the disc to generate an audible warning. A bend in the spring clip permits the backing plate to abut a piston cup without interference by the spring clip for urging the backing plate and friction element toward the disc. Either prong on the spring clip is engageable with the disc to generate an audible warning to a motor vehicle operator.

1 Claim, 3 Drawing Figures

DISC BRAKE WEAR INDICATOR

BACKGROUND OF THE INVENTION

Various brake wear indicators are provided by the prior art. When the friction lining of the brake is worn to a predetermined thickness, these indicators either generate an audible sound for warning a motor vehicle operator or energize an electric circuit to provide a read out, alerting the operator to the worn friction lining condition of the brake.

With reference to a disc brake wear indicator, the prior art generally provides a probe extending through the backing plate of the friction lining, which probe is activated by the moving disc, when the disc wears the friction lining between the probe and disc. In general, these prior art wear indicators require manufacturing alterations to the existing disc brake in order to integrate the wear indicator into the disc brake assembly.

SUMMARY OF THE INVENTION

The present invention provides a simple audible disc brake wear indicator that is easily attached to an existing disc brake with few modifications to the existing disc brake construction.

A generally U-shaped spring clip connects to the back of a backing plate by any suitable means, such as welding, and extends around the periphery of the backing plate, terminating in a pair of prongs. Both prongs are disposed a predetermined distance from the face of the backing plate, axially intermediate a friction lining or element. When the disc has worn the friction element to an axial width that is equal to the predetermined distance, either prong is engageable with the disc to vibrate, when the disc is moving, thereby generating an audible signal which warns the operator of the worn condition of the friction element.

In accordance with the invention, the backing plate requires no alteration of modification as the spring clip attaches thereto by any suitable means, such as spot welding. Moreover, a recess on the spring clip is provided so as not to interfere with rivets that connect the friction element to the backing plate.

A further aspect of the present invention provides for the attachment of the disc brake wear indicator to the inner backing plate, which is disposed adjacent a piston cup and engageable therewith for movement toward the disc.

DETAILED DESCRIPTION

Figure 1:
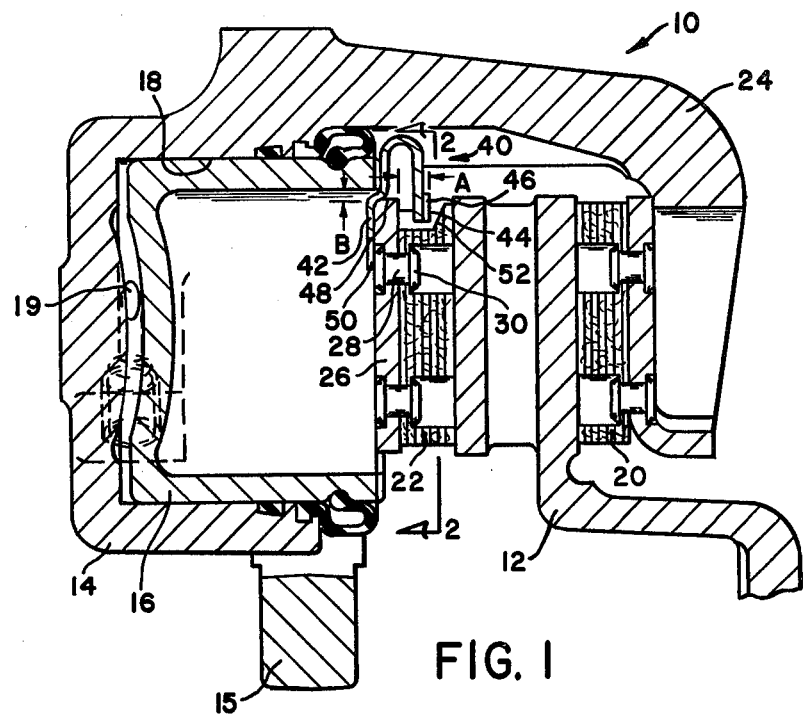
FIG. 1 is a fragmentary cross sectional view of a disc brake showing a piston cup engaging a backing plate for urging a friction element toward a disc.

A disc brake 10 is illustrated in the fragmentary view of FIG. 1. A disc or rotor 12 is secured to an axle (not shown) in a conventional manner and rotates therewith. The axle housing (not shown) supports a sliding caliper housing 14, via torque member 15, which housing 14 slidably carries a piston cup 16 in a bore 18 that is in communication with a hydraulic actuating means (not shown) via port 19. In a manner well known in the prior art, the actuating means communicates pressure to the bore 18 for slidably moving the piston cup 16 toward the disc 12.

In order to frictionally restrict the rotation of disc 12, a pair of friction elements 20 and 22 are disposed on opposite sides of the disc 12 and are engageable therewith upon movement of the piston cup 16.

The axially outer friction element 20 is secured by any suitable means to a reaction arm 24 of the caliper housing 14, while the axially inner friction element 22 includes a backing plate 26 and is secured thereto by means of rivets 28. The backing plate 26 is slidably mounted on the caliper housing for axial movement relative thereto.

Figure 2:
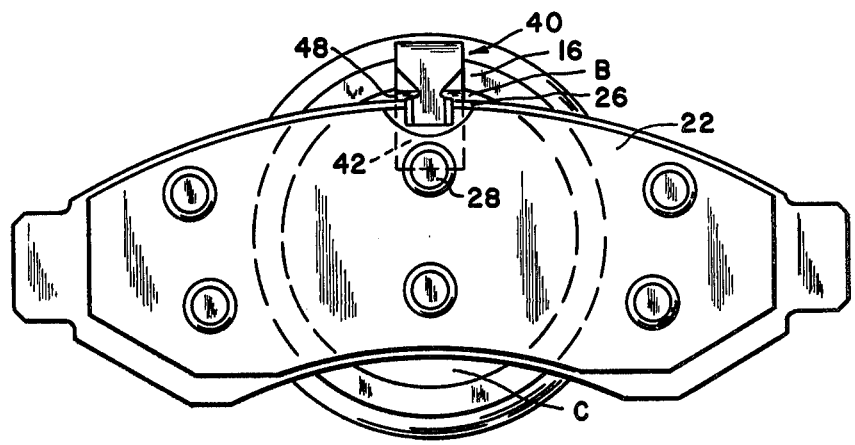
FIG. 2 is a right side view of FIG. 1 taken along line 2—2.

In accordance with the preferred embodiment of the invention, a spring clip or wear indicator 40 is connected by any suitable means, such as welding, at one end 42 to the inside of the backing plate 26. Extending from the one end 42, the spring clip 40 is generally U-shaped to extend radially past the piston cup 16, as seen in FIG. 2, around the radially outer edge of the backing plate 26. A pair of prongs 44 are formed at the other end of the spring clip by axially outwardly turning flanges 46, which flanges, together with the generally U-shaped spring clip, generate an audible signal when in scraping contact with a moving member to warn the motor vehicle operator of the scraping contact.

In order to permit the piston cup 16 to contact the backing plate 26, the spring clip 40 is provided with a bend at 48 which bend extends the spring clip 40 axially outwardly through the segmented clearance B, formed between the inner diameter of the piston cup 16 and the radially outer edge of the backing plate 26, as seen more clearly in FIG. 2. Consequently, the spring clip 40 does not interfere with the engagement between the piston cup and the backing plate when the piston cup abuts the backing plate to urge the friction element 22 into braking engagement with disc 12.

Figure 3:
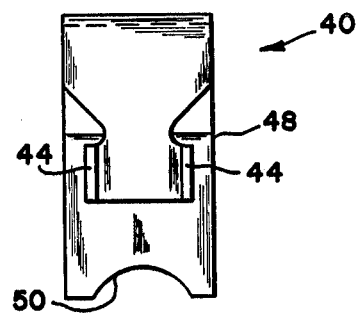
FIG. 3 is a right side view of the spring clip of FIG. 1.

Turning to FIG. 3, the spring clip 40 includes a recess 50, which permits the removal and installation of rivet 28. Consequently, the friction element 22 can be installed and removed from the backing plate 26 via rivet 28 with the spring clip 40 remaining connected thereto. Moreover, the spring clip 40 can be connected to the backing plate 26 without disturbing the rivet 28 and the friction element 22.

When the wear indicator 40 is connected to the backing plate 26, the prongs 44 are positioned a predetermined distance A, see FIG. 1, from the surface of the backing plate 26 facing the disc 12. This predetermined distance is inclusive of the rivet head 30 facing disc 12 so that a warning, as described hereinabove, will occur before the disc 12 wears the friction element 22 such that the rivet head 30 frictionally engages the disc to restrict the rotation of the disc. Consequently, the axial width of friction element 26 less the predetermined distance A provides the amount of permissible wear for the friction element 22 before the prongs 44 contact disc face 12.

A recess 52 in the friction element 22 receives the other end of the U-shaped spring clip 40 and the recess axial width is equal to or greater than the predetermined distance A. If the recess is equal to the distance A, the spring clip may be biased so that the prongs 44 are urged by the tension of the spring clip axially toward the disc. Consequently, when the friction element wears through the permissible wear, the prongs 44 are biased into engagement with the disc regardless of the contact between the friction element 22 and the disc 12. If the recess is greater than the distance A, the prongs 44 of the spring clip are set to a distance A from the backing plate so that when the friction element wears through the permissible wear and the disc contacts the friction element the prongs 44 will be engaged with the rotating disc to generate an audible signal.

A further aspect of the present invention provides for the elimination of the recess 52 so long as the disc 12 extends radially outwardly of the friction element 22. With this construction, the prongs are positioned an axial predetermined distance A from the face of the backing plate 26 and radially outwardly of the friction element 22 yet axially in alignment with a portion of the disc 12 so that the prongs engage the disc when the friction element is worn to an axial width equal to the predetermined distance A.

MODE OF OPERATION

The disc brake 10 operates in a manner that is well known in the prior art. Increasing pressures in bore 18 cause the piston cup 16 to move to the right, viewing FIG. 1, thereby moving the friction element 22 to the right to frictionally engage the disc 12. Reaction forces acting through the arm 24 move the friction element 20 and caliper housing 14 to the left, viewing FIG. 1, so that both friction elements frictionally engage the disc 12 to restrict the rotation of the disc 12.

Repeated braking by the disc brake 10 causes the friction elements 20 and 22 to wear substantially equally thereby reducing the axial width of each element. In particular, when the disc 12 wears the friction element 22 to an axial dimension equal to the predetermined distance A, the rotating disc 12 contacts either prong 44. The moving contact or scraping between either prong 44 and disc 12 vibrates the spring clip 40 to generate a noise, the pitch of which is dependent on the dimensions of the U-shaped spring clip 40. Consequently, a motor vehicle operator will be made aware of the noise generated by disc brake 10 and will be forewarned that the friction elements 22 and 20 have only a predetermined distance A of wear left.

As mentioned earlier, the wear indicator 40 is readily adapted for attachment to an existing disc brake. Moreover, the bend at 48 and the recess at 50 provide for the installation of the wear indicator 40 on the inner friction element 22 and its corresponding backing plate 26 with no alterations to the existing disc brake.

Although FIGS. 1-3 show the spring clip extending around the radially outer periphery of the backing plate 26, it is understood that the spring clip 40 could also extend around the radially inner periphery of the backing plate, as a segmented clearance at C, viewing FIG. 2, is also formed between the inner diameter of the piston cup and the radially inner edge of the backing plate.

In those cases where space at B or C is not available between the piston 16 and the inner backing plate 26 to accomodate spring clip 40, it is possible to slot the inner backing plate 26 to accept the end 42 of the spring clip 40 in order that piston 16 is able to contact the inner backing plate 26 without contacting the spring clip 40.

Moreover, although a pair of prongs 44 are provided to vibrationally engage the moving disc 12, it is believed that a ridge or raised edge at the other end of the spring clip 40 could be provided to generate an audible warning signal when the ridge or raised edge contacts the moving disc.

I claim:

1. In a disc brake having a pair of friction elements that are enageable with a disc during braking, a backing plate supporting one of the pair of friction elements and being movable with the one friction element when the latter is urged into engagement with the disc, and a brake wear indicator attached to the backing plate for providing a warning when the one friction element is worn to a predetermined dimension, the improvement in which said brake wear indicator comprises a U-shaped spring clip which extends from an attachment on one side of the backing plate to the other side, said one friction element having a recess for receiving a portion of said U-shaped spring clip which extends on the other side of the backing plate and said U-shaped spring clip terminating at the portion in a pair of axially outwardly extending prongs which are engageable with the portion of the disc that is engageable with the one friction element when the latter is worn to a predetermined dimension, said backing plate being engageable with a piston cup which moves the backing plate and one friction element toward the disc during braking, said U-shaped spring clip extending radially outwardly past the piston cup around the outer edge of the backing plate between the attachment with the backing plate and the axially outwardly extending prongs, said prongs and attachment being disposed on opposite sides of the backing plate at substantially the same radial position, said U-shaped spring clip including a bend adjacent the connection to the backing plate to remain spaced from the piston cup when the piston cup is engaging the backing plate, and said U-shaped spring clip including at least one recess adjacent the attachment with said backing plate to avoid interfering with the means for supporting the one friction element to the backing plate.

* * * * *